US010267196B1

United States Patent
Hartley et al.

(10) Patent No.: US 10,267,196 B1
(45) Date of Patent: Apr. 23, 2019

(54) TREATMENT OF REDUCTANT UREA SOLUTIONS WITH CATALYST PRECURSORS TO ASSIST SELECTIVE CATALYTIC REDUCTION

(71) Applicant: Southwest Research Institute, San Antonio, TX (US)

(72) Inventors: Ryan C. Hartley, Kerrville, TX (US); Gordon J. J. Bartley, San Antonio, TX (US)

(73) Assignee: SOUTHWEST RESEARCH INSTITUTE, San Antonio, TX (US)

( * ) Notice: Subject to any disclaimer, the term of this patent is extended or adjusted under 35 U.S.C. 154(b) by 0 days.

(21) Appl. No.: 15/843,401

(22) Filed: Dec. 15, 2017

Related U.S. Application Data (63) Continuation-in-part of application No. 15/660,477, filed on Jul. 26, 2017, now abandoned, which is a
(Continued)

(51) Int. Cl.
*F01N 3/20* (2006.01)
*C01C 1/08* (2006.01)
(Continued)

(52) U.S. Cl.
CPC ....... *F01N 3/2073* (2013.01); *B01D 53/9418* (2013.01); *B01J 21/063* (2013.01);
(Continued)

(58) Field of Classification Search
CPC .... B01D 2257/404; B01D 2255/20707; B01D 2251/21; B01D 2251/206; B01D 2258/012; B01D 53/94; B01D 53/9422; B01D 53/9418; B01J 37/086; B01J 31/12; B01J 21/063; B01J 53/9422; B01J 53/9418;
(Continued)

(56) References Cited

U.S. PATENT DOCUMENTS

| 5,087,431 A | 2/1992 | Gardner-Chavis et al. |
| 5,171,558 A | 12/1992 | Gardner-Chavis et al. |

(Continued)

FOREIGN PATENT DOCUMENTS

| EP | 0 894 523 A1 * | 2/1999 | ............. B01D 53/86 |
| FR | 304 4564 A1 | 6/2017 | |

(Continued)

OTHER PUBLICATIONS

Bernhard, et al; Catalytic Urea Hydrolysis in the Selective Catalytic Reduction of NOx: Catalyst Screening and Kinetics on Anatase TiO2 and ZrO2; The Royal Society of Chemistry, 2013, Catalysis Science & Technology, vol. 3, pp. 942-951.
(Continued)

*Primary Examiner* — Timothy C Vanoy
(74) *Attorney, Agent, or Firm* — Grossman, Tucker et al (57) ABSTRACT

The present disclosure is directed at treatment of reductant urea solutions with water soluble organometallic catalyst precursors which convert to active catalyst compounds in diesel exhaust gas systems. The active catalysts then promote hydrolysis of isocyanic acid into ammonia and/or decomposition of relatively high molecular weight deposits which deposits may otherwise reduce selective catalytic reduction efficiency.

24 Claims, 4 Drawing Sheets

Related U.S. Application Data continuation-in-part of application No. 15/265,218, filed on Sep. 14, 2016, now abandoned.

(51) Int. Cl.
*B01J 21/06* (2006.01)
*B01D 53/94* (2006.01)

(52) U.S. Cl.
CPC .... *C01C 1/086* (2013.01); *B01D 2255/20707* (2013.01); *F01N 2240/25* (2013.01); *F01N 2610/01* (2013.01); *F01N 2610/02* (2013.01)

(58) Field of Classification Search
CPC ................ B01J 21/06; F01N 2610/102; F01N 2610/02; F01N 2610/01; F01N 2570/14; F01N 2550/05; F01N 2240/25; F01N 3/2073; C01C 1/086
See application file for complete search history.

(56) References Cited

U.S. PATENT DOCUMENTS

| | | | | |
|---|---|---|---|---|
| 5,342,599 | A * | 8/1994 | Slone | B01D 53/56 423/236 |
| 5,827,490 | A | 10/1998 | Jones | |
| 6,203,770 | B1 * | 3/2001 | Peter-Hoblyn | B01D 53/90 422/168 |
| 6,361,754 | B1 * | 3/2002 | Peter-Hoblyn | B01D 53/90 422/169 |
| 8,176,731 | B2 * | 5/2012 | Doring | F01N 13/011 60/297 |
| 2004/0040288 | A1 * | 3/2004 | Jacob | B01D 53/8631 60/286 |
| 2009/0269265 | A1 * | 10/2009 | Ando | B01D 53/90 423/239.2 |
| 2014/0369910 | A1 | 12/2014 | Ayyappan et al. | |
| 2016/0051931 | A1 * | 2/2016 | Ito | B01J 37/0244 422/180 |
| 2016/0074809 | A1 | 3/2016 | Goffe | |

FOREIGN PATENT DOCUMENTS

| | | |
|---|---|---|
| JP | 2013541662 A | 11/2013 |
| WO | 2012104205 A1 | 8/2012 |

OTHER PUBLICATIONS

Bernhard et al; "Hydrolysis and Thermolysis of Urea and its Decomposition Byproducts Biuret, Cyanuric Acid and Melamine Over Anatase $TiO_2$"; Applied Catalysis B: Environmental vol. 115-116, (2012) pp. 129-137.

Hauck, et al; "Surface Chemistry and Kinetics of the Hydrolysis of Isocyanic Acid on Anatase"; ScienceDirect; Applied Catalysis B: Environmental 70, 2007, pp. 91-99.

Johnson, T.V.; "Diesel Emissions in Review"; SAE International, 2011-1-0304; Published Apr. 12, 2011 (15 pgs).

Kleemann, M., et al; "Hydrolysis of Isocyanic Acid on SCR Catalysts"; —Ind. Eng. Chem Res. 2000, vol. 39, pp. 4120-4126.

Majewski; "Selective Catalytic Reduction"; DieselNet Technology Guide, Diesel Catalysts; <<https://www.dieselnet.com/tech/cat_scr.php>> (accessed Aug. 30, 2016).

Matolygina, et al; "Synthesis of Superfine Titania via High-Temperature Hydolysis of Titanium (IV) Bis(ammonium actato) Dihydroxide"; Doklady Chemistry: vol. 441 Part 2, pp. 361-364, Nov. 2011.

Piazzesi, G., PhD; Thesis: "The Catalytic Hydrolysis of Isocyanic Acid (HNCO) in the Urea-SCR Process"; dissertation submitted to the Swiss Federal Institute of Technology, ETH No. 16693, Zurich, 2006 (164 pgs).

Strots, et al; "Deposit Formation in Urea-SCR Systems"; SAE International, 2009, Journal of Fuels and Lubricants., vol. 2, Issue 2, pp. 283-289.

Zahn, et al; "Catalytic Hydrolysis of S-Triazine Compounds Over $Al_2O_3$"; Catalysis Today, vol. 27 (1996), pp. 167-173.

\* cited by examiner

TREATMENT OF REDUCTANT UREA SOLUTIONS WITH CATALYST PRECURSORS TO ASSIST SELECTIVE CATALYTIC REDUCTION

CROSS-REFERENCE TO RELATED APPLICATIONS

This application is a continuation-in-part of U.S. application Ser. No. 15/660,477 filed Jul. 26, 2017, which is a continuation-in-part of U.S. application Ser. No. 15/265,218 filed Sep. 14, 2016.

FIELD

The present disclosure is directed at treatment of reductant urea solutions with water soluble organometallic catalyst precursors which convert to active catalyst compounds in diesel exhaust gas systems. The active catalysts then promote hydrolysis of isocyanic acid into ammonia and/or decomposition of relatively high molecular weight deposits which deposits may otherwise reduce selective catalytic reduction efficiency.

BACKGROUND

Internal combustion engines such as those found in cars and trucks may produce combustion byproducts and/or products of incomplete combustion which may exist in the engine exhaust and emit into the environment. Per emissions regulations, the exhaust may be treated to reduce the concentration of such products and, therefore, reduce pollution. Although spark ignition (i.e., gasoline) engines may use three-way catalytic converters to satisfy emissions regulations, compression ignition (i.e., diesel) engines typically employ two-way catalytic converters which may not efficiently reduce nitrogen oxides (NOx). Accordingly, diesel engines may include selective catalytic reduction (SCR) systems in order to seek reduction in nitrogen oxide concentrations. Improving performance of such systems remains an ongoing area of research and development.

SUMMARY

A method of reducing oxides of nitrogen in a diesel engine producing diesel exhaust comprising providing a diesel emission fluid containing an aqueous based urea solution including a catalyst precursor comprising a water soluble organometallic compound. One may then introduce the diesel emission fluid into the diesel exhaust wherein the urea converts to ammonia and isocyanic acid and the catalyst precursor converts to a catalyst. This is then followed by converting the isocyanic acid to ammonia with the catalyst wherein the ammonia is provided to a selective catalytic reduction system and reacts with oxides of nitrogen and provides nitrogen and water.

In a related method embodiment, the present disclosure is again directed at a method of reducing oxides of nitrogen in a diesel engine producing diesel exhaust comprising providing a diesel emission fluid containing an aqueous based urea solution including a catalyst precursor comprising a water soluble organo-titanium compound dissolved in said urea solution. The diesel emission fluid is then introduced to the diesel exhaust wherein the urea converts to ammonia and isocyanic acid and the catalyst precursor converts to titanium dioxide catalyst. This is then followed by converting said isocyanic acid to ammonia with titanium dioxide catalyst wherein the ammonia is provided to a selective catalytic reduction system and reacts with the oxides of nitrogen and provides nitrogen and water.

The present disclosure also relates to a formulation for reducing oxides of nitrogen in diesel engine exhaust comprising an aqueous based solution of urea and a water soluble organometallic catalyst precursor dissolved in said aqueous based solution of urea at a level of 0.1 wt. % to 25.0 wt. %.

DESCRIPTION OF THE DRAWINGS

The various aspects and advantages of the present disclosure may be better understood by reference to the following detailed description, in conjunction with the accompanying drawings, wherein.

DETAILED DESCRIPTION

Urea is used as a convenient source of ammonia ($NH_3$) reductant in SCR systems for decreasing NOx emissions from diesel engines. Urea ($H_2NCONH_2$) is therefore a component of what is termed a diesel emission fluid (DEF) that is preferably introduced as a spray into the exhaust gases upstream of the SCR catalyst. The DEF vaporizes and the urea thermally decomposes into $NH_3$ and HNCO (isocyanic acid), with subsequent hydrolysis of the HNCO into additional amounts of $NH_3$ along with $CO_2$:

The ammonia as formed above may then be utilized as the reductant in selective catalytic reduction (SCR) to reduce NOx to nitrogen and water. Such reactions include the following:

However, urea is observed to deposit on the walls of the exhaust system and/or the SCR catalyst as solid urea or as a deposit mixture of urea and isocyanic acid. Over time, in the presence of relatively hot exhaust gases, secondary reactions can occur in which such deposits (urea and isocyanic acid) convert to a range of relatively higher molecular weight compounds. Such higher molecular weight compound deposits may include one or more of the following:

TABLE 1

Deposits On Exhaust System Or SCR Catalyst

| Compound | Structure |
|---|---|
| Biuret | $H_2N-C(=O)-NH-C(=O)-NH_2$ |
| Triuret | (structure shown) |
| Cyanuric Acid | (triazine with three OH) |
| Ammelide | (triazine with $NH_2$, two OH) |
| Ammeline | (triazine with two $NH_2$, one OH) |
| Melamine | (triazine with three $NH_2$) |

The deposits, once formed, then serve to reduce the efficiency of the exhaust gas treatment by either reducing exhaust gas flow and/or reducing efficiency of the SCR catalyst from efficient reaction with ammonia to reduce NOx gas concentration. In addition, although heating to elevated temperature such as in the range of 193° C. to 700° C. can serve to decompose the above identified relatively high molecular weight deposits, as well as polymeric type deposits, it can be appreciated that this adds a level of complexity to the system and potential for other associated problems.

Figure 1:
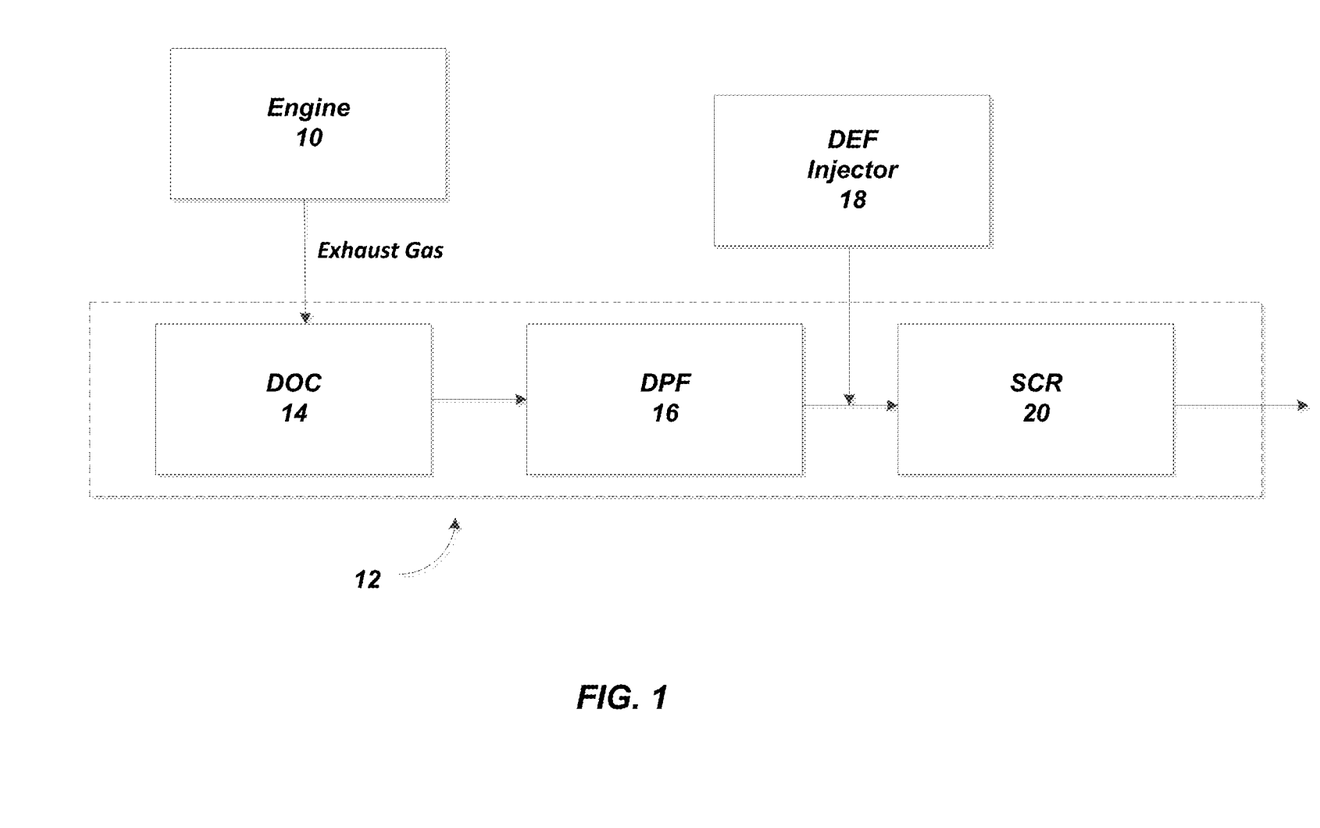
FIG. 1 illustrates in block diagram form an overview of a diesel engine outputting exhaust gas to an exhaust gas after-treatment system.

Attention is directed to FIG. 1, which provides in block diagram form an overview of a compression ignition engine 10, such as a diesel engine, outputting exhaust gas to an exhaust after-treatment system 12 which may include a diesel oxidation catalyst (DOC) 14 which connects to a diesel particulate filter (DPF) 16 which then feeds the selective catalyst reduction (SCR) system 20. A diesel emission fluid (DEF) injector is provided at 18 which contains an aqueous based urea solution that now also includes a catalyst precursor. Preferably aqueous urea based solutions that are employed typically include those having 30.0 wt. % to 40.0 wt. % urea, and preferably 32.5 wt. % urea.

The catalyst precursor herein is preferably one that has a requisite amount of solubility in the aqueous urea solution and which then is capable of decomposition at temperatures similar to those that are relied upon to convert urea into ammonia. Preferably, the temperature range for decomposition of the catalyst precursor is 45° C. to 180° C., more preferably in the range of 75° C. to 125° C. Such catalyst precursors, upon decomposition at such temperatures in the exhaust gas after-treatment system will then operate to provide a target catalyst which serves to achieve one or more of the following: (1) hydrolyze the isocyanic acid to form ammonia to assist in SCR; (2) reduce and/or eliminate the build-up of relatively higher molecular weight deposits that would otherwise be formed from the isocyanic acid; and (3) decompose the relatively higher molecular weight deposit compounds found in the exhaust gas after treatment system, such as within the SCR system 20 (e.g., biuret, triuret, cyanuric acid, ammelide, ammeline, and/or melamine). This decomposition is contemplated to occur at temperatures that are lower than the temperatures that are typically relied upon for their thermal decomposition (e.g. pyrolysis) and removal.

The catalyst precursors herein preferably include water soluble organometallic compounds that will upon decomposition provide the catalytic activity noted above. Preferably, such organometallic compounds include titanium acetates such as titanium(IV) acetate ($C_8H_{12}O_8Ti$) which is water soluble and has a boiling point of 117° C. and which is therefore suitable for use as part of the diesel emission fluid. Upon heating (exposure to elevated temperature exhaust gases) the titanium(IV) acetate will decomposes to provide catalytic titanium oxide which may proceed according to the following general reaction:

$$C_8H_{12}O_8Ti + 8O_2 \longrightarrow TiO_2 + 8CO_2 + 6H_2O$$

Accordingly, the titanium oxide ($TiO_2$) as the target catalyst will now conveniently serve to improve the exhaust gas treatment by hydrolyzing the isocyanic acid present to ammonia in order to reduce and/or eliminate the build-up of relatively higher molecular weight deposits. In addition, as noted, the $TiO_2$ can also allow for decomposition of any relatively high molecular weight deposits that may be present, and allow for such decomposition at relatively lower temperatures than ordinarily used for thermal (pyrolytic) decomposition.

Other water soluble organometallics that may be combined in the DEF are contemplated to include titanium(IV) bis(ammonium lactato)dihydroxide ($C_6H_{18}N_2O_8Ti$), which is another water soluble titanium complex and is available as a 50 wt. % in water solution (Sigma-Aldrich) with a flash point of 27° C. Accordingly, upon exposure to elevated temperatures in the exhaust gases, the following accounts for the formation of the target titanium dioxide catalyst:

$$[CH_3CH(O-)CO_2NH_4]_2\ Ti(OH)_2 + 6O_2 \longrightarrow TiO_2 + 6CO_2 + 6H_2O + 2NH_3$$

Another candidate catalyst precursor is contemplated to include titanium(III)oxalate decahydrate ($Ti_2(C_2O_4)_3 \cdot 10H_2O$). It may therefore be appreciated the preferably, the catalyst precursor may therefore comprise one or more of titanium(IV) acetate, Ti(IV)bis(ammonium lactato)dihydroxide or titanium(III)oxalate. Accordingly, mixtures of such water soluble organometallic catalyst precursors may be employed.

Other preferred catalyst precursors are contemplated to include ammonium titanyl oxalate (ATO), $C_4O_9N_2H_8Ti$, having the following structure:

A still further preferred precursor includes titanium oxyacetylacetonate, $C_{10}H_{14}O_5Ti$ having the following structure:

A still further preferred precursor includes $Zr^{4+}$ compounds such as zirconia dioxide ($ZrO_2$). Similar to $TiO_2$ disclosed above, it is contemplated that $ZrO_2$ can similarly serve to improve the exhaust gas treatment by hydrolyzing the isocyanic acid present to ammonia:

It is therefore contemplated herein that with respect to a given urea-water solution containing a catalyst precursor comprising a water soluble organometallic compound, such as an organometallic compound as noted above that decomposes to form $TiO_2$, one may include a $Zr^{4+}$ type compound, such as $ZrO_2$. As may now be appreciated, in the event that isocyanic acid deposits are formed on the walls of the exhaust system or SCR catalyst, the $ZrO_2$ can additionally serve to reduce such deposits and improve SCR performance.

Therefore, in the broad context of the present disclosure, the organometallic compounds are preferably selected from organo-titanium compounds, which as noted have solubility in water, wherein the solubility is preferably at a level sufficient to allow the organo-titanium compound, as the catalyst precursor, to decompose in the exhaust gases and provide a sufficient amount of catalyst ($TiO_2$) to then hydrolyze the isocyanic acid present to ammonia. Such water solubility of the organometallic compound catalyst precursor in water is contemplated to be at a level of 0.1 wt. % to 25.0 wt. %, more preferably in the range of 0.1 wt. % to 10.0 wt. %, as well as 0.1 wt. % to 5.0 wt. %. The solubility is such that it is contemplated to be maintained at a temperature range between −11° C. (the freezing point of a 32.5% urea water solution) and 50° C.

It is further contemplated the amount of catalyst, derived from the water soluble organometallic precursor, is then preferably formed in the exhaust after-treatment system 12 at a level of 0.01 wt % to 1.0 wt % within the introduced DEF comprising the aqueous urea solution. Accordingly, one may preferably employ an amount of, e.g. titanium(IV) acetate ($C_8H_{12}O_8Ti$) precursor in the aqueous urea solution, such that upon delivery and decomposition to titanium oxide in the exhaust gas after-treatment system, the level of titanium oxide in the injected DEF is in the range of 0.01 wt. % to 1.0 wt. %. Moreover, as alluded to above, one may optionally include $ZrO_2$ in the urea water solution to augment the ability to reduce isocyanic acid deposits. Therefore, it is contemplated that the level of $ZrO_2$ in the urea-water solution, either on its own or in combination with the organometallic precursor catalyst, is similarly in the range of 0.01 wt % to 1.0 wt. %.

Figure 2:
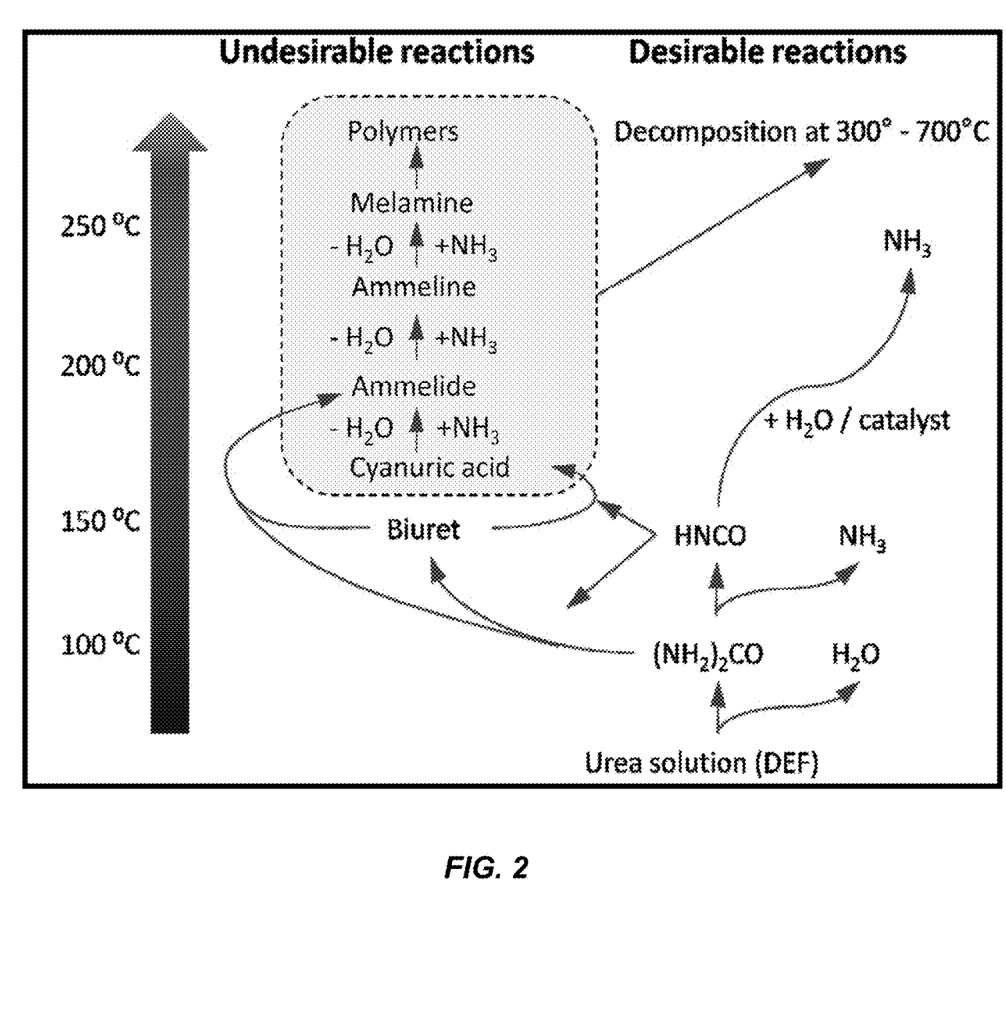
FIG. 2 illustrates the potential reactions of urea in the exhaust gas environment of a SCR system.

Attention is next directed to FIG. 2 which now provides another useful overview of the disclosure herein. As can be seen, the DEF (aqueous urea solution) upon exposure to heat from the exhaust gases (~100° C.) will decompose to provide both isocyanic acid and the desirable ammonia for feeding to the SCR system. The isocyanic acid will then be prone to convert, via what is broadly identified as an undesirable reaction pathway, to the relatively higher molecular weight compound deposits, containing one or more of biuret, cyanuric acid, ammelide, ammeline, melamine and other macromolecular and polymer type compounds. Such compounds will then compromise the efficiency of the SCR system to reduce levels of NOx.

Accordingly, by placement of the catalyst precursor herein into the DEF, as shown in FIG. 2, the catalyst precursor is such that upon exposure to exhaust gases and temperatures preferably in the range of about 100° C. to 300° C., the catalyst precursor (soluble organometallic compound) is converted into catalyst (e.g. titanium oxide) and the catalyst reduces or eliminates the conversion of the isocyanic (HNCO) to the relatively high molecular weight deposits. Instead, as illustrated, the isocyanic acid is converted to additional amounts of ammonia for the SCR process. It is noted that deposit formation may be particularly prominent at temperatures in the range of 185° C. to 250° C. Accordingly, the use of the catalyst precursors herein to reduce deposition formation that occur in the temperature range of 185° C. to 250° C. is particularly advantageous.

In addition, the catalyst precursors herein can serve to facilitate a relatively lower temperature degradation of the relatively high molecular weight compounds forming the deposits comprising biuret, cyanuric acid, ammelide, ammeline and melamine, and such degradation may now occur in the temperature range of 130° C. to 300° C.

Figure 3:
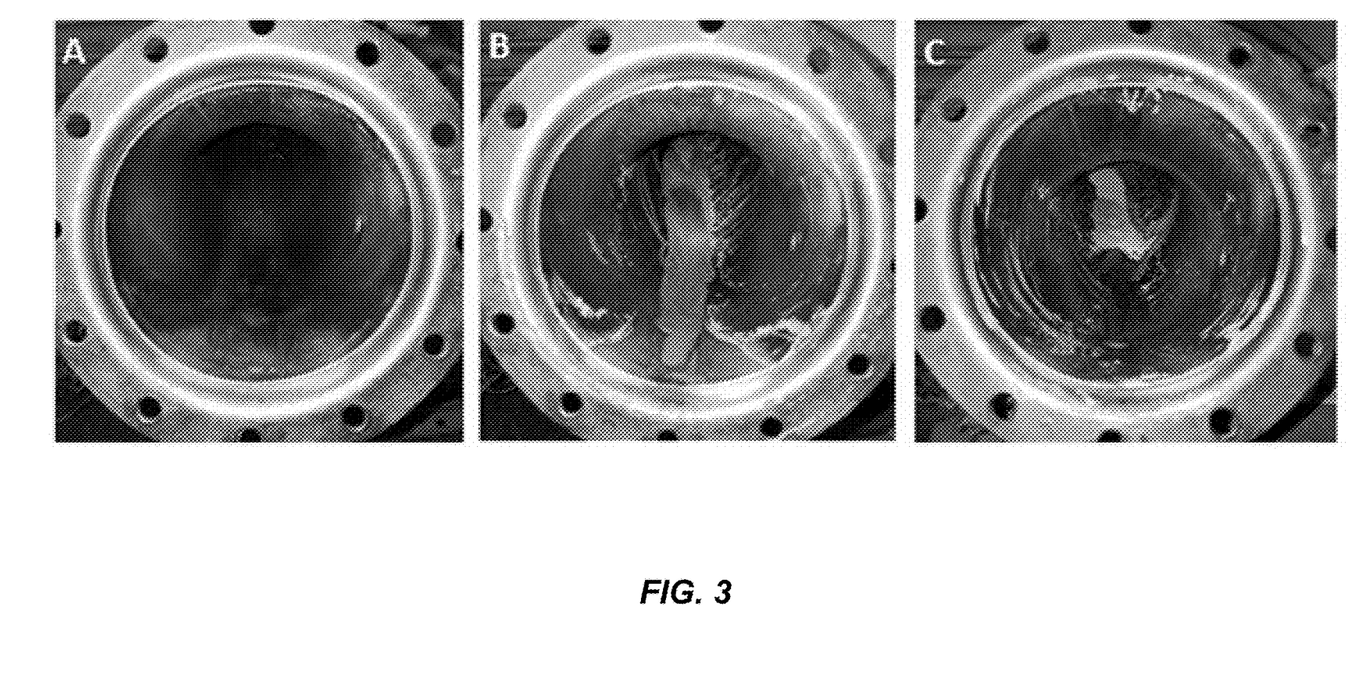
FIG. 3 illustrates the effect of ATO addition to urea water solutions with respect to deposit formation.

Reference is next made to FIG. 3 which illustrates in identified images "A", "B" and "C" how the addition of ATO to a urea water solution can impact the formation of deposits. FIG. 3 image "A" has the highest concentration of ATO at 0.1 mol % (1.74 g ATO/liter UWS). FIG. 3 image "B" has a concentration of 0.05 mol % ATO, (0.87 g ATO/liter UWS). FIG. 3 image "C" is UWS without addition ATO. It is apparent that increasing the concentration of ATO incorporated into the UWS results in a decrease in the amount of formed deposits.

Figure 4:
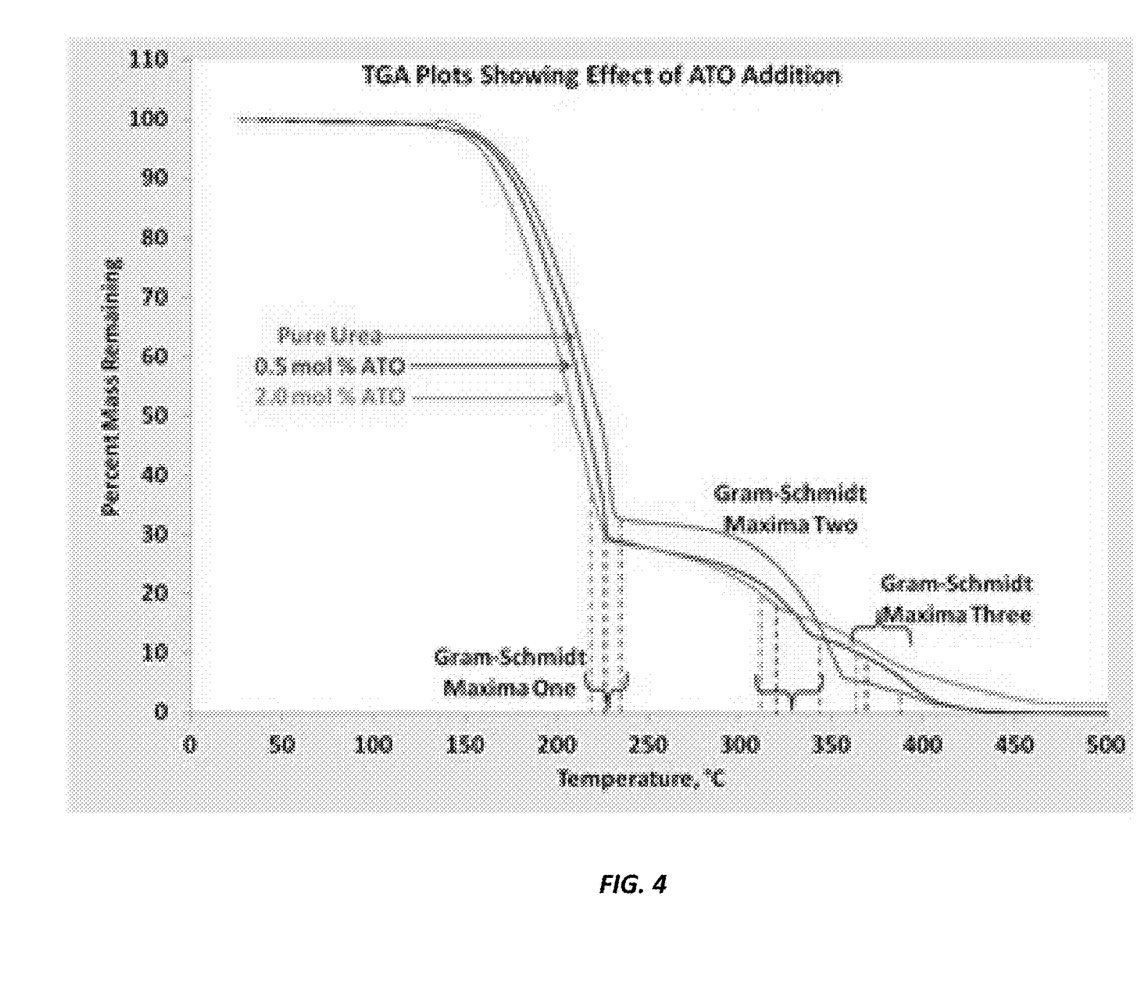
FIG. 4 illustrates the effect of ATO addition to urea water solutions evaluated by thermogravimetric analysis (TGA).

Reference is next made to FIG. 4 which identifies the use of thermogravimetric analysis (TGA) coupled to a Fourier Transform Infrared (FTIR) spectrophotometer. Samples were prepared by incorporating the identified concentration of ATO with urea via lyophilization (freeze drying). Samples then underwent TGA and the evolved gases were analyzed using IR spectroscopy. FIG. 4 shows the overlaid TGA data from three samples: pure urea, 0.5 mol % ATO in urea, and 2.0 mol % ATO in urea. The Gram-Schmidt values shown in the plot are an indication of the temperature at which the maximum amounts of gasses from the sample were evolved. As a general trend, the maximum off-gassing events occurred at lower temperatures as the concentration of ATO in the sample increased. The decrease in the temperatures of Gram-Schmidt maxima indicates that ATO catalyzes the overall decomposition of urea as given by the following reaction:

$$CO(NH_2)_2 + H_2O \longrightarrow 2NH_3 + CO_2$$

An addition testing evaluation was run to further confirm the use of the catalyst precursors herein to reduce deposits. Two conditions were considered. Condition 1 consisted of a moderate duty cycle injection at relatively low temperature. More specifically, a DEF injector duty cycle of 13.1%, a target gas temperature of 215° C., engine speed of 1375 rpm, exhaust flow of 670 kg/hr for a time of 1.0 hour. Condition 2 consisted of a high duty cycle injection at high temperature. In both cases after 1.0 hour the exhaust pipe was disassembled and deposits were collected and weighed.

For Condition 1, and utilizing a DEF, namely a urea water solution, after 1.0 hour of operation 0.4 g of deposits were recovered from the mixer region and 4.2 g were recovered from the elbow region, with a total amount of deposits of 4.6 g. By contrast, when using 0.2 mol. % ATO in the same urea water solution, only 0.2 g of deposits were recovered from the mixer region and only 0.7 g of deposits were recovered from the elbow region for a total mass of recovered deposits of 0.9 g. As may therefore be appreciated, in the absence of the ATO catalyst precursor the deposit mass increased 411% (0.9 g versus 4.6 g). For Condition 2, and again utilizing a urea water solution, after 1.0 hour of operation, 6.4 g of deposits were recovered from the mixer region. By contrast, when using 0.2 mol. % ATO in the same urea water solution, only 3.5 g of deposits were recovered from the mixer region. As may therefore be appreciated, in the absence of the ATO catalyst precursor the deposit mass increased 45% (6.4 g versus 3.5 g).

Accordingly, some of the remarkable benefits of the aforementioned use of the catalyst precursors herein therefore includes the ability to now improve emissions by allowing for DEF injection at relatively lower exhaust temperatures (e.g. 185° C. to 250° C.) to then reduce deposit formation that otherwise compromises the efficiency of the SCR system. In other words, the catalyst precursors herein will provide for reduced cold start emissions on vehicles equipped with a SCR catalyst. In addition, the reduction in deposit formation as described herein is such that it is contemplated to reduce system backpressure. System backpressure in turn results in an increase in fuel consumption. By reducing deposits there will therefore be a reduction in fuel consumption in the vehicle. In addition, by reducing deposits, the requirement for a high temperature regeneration period to breakdown and remove the deposits can be reduced or avoided. Furthermore, the identified high molecular weight deposits herein are such that they tend to have corrosive effects when in contact with the metals utilized in exhaust piping. Reduction or removal of such deposits therefore is contemplated to extend the lifetime of the metallic exhaust system and reduce or eliminate loss of its structural integrity.

The invention claimed is:

1. A method of reducing oxides of nitrogen in a diesel engine producing diesel exhaust comprising:
providing a diesel emission fluid containing an aqueous based urea solution including a catalyst precursor comprising a water soluble organometallic compound;
introducing said diesel emission fluid into the diesel exhaust wherein said urea converts to ammonia and isocyanic acid and said catalyst precursor converts to a catalyst;
converting said isocyanic acid to ammonia with said catalyst wherein said ammonia is provided to a selective catalytic reduction system and reacts with said oxides of nitrogen and provides nitrogen and water.

2. The method of claim 1 wherein said selective catalyst reduction system contains one or more compounds of biuret, triuret, cyanuric acid, ammelide, ammeline or melamine and said catalyst promotes thermal decomposition and removal of said one or more compounds from said SCR system.

3. The method of claim 2 wherein said thermal decomposition occurs at a temperature of 130° C. to 300° C.

4. The method of claim 1 wherein said catalyst precursor converts to a catalyst at a temperature of 45° C. to 180° C.

5. The method of claim 1 wherein said catalyst precursor converts to a catalyst at a temperature of 75° C. to 125° C.

6. The method of claim 1 wherein said water soluble organometallic precursor is soluble in said aqueous based urea solution at a level of 0.1 wt. % to 25.0 wt. %.

7. The method of claim 1 wherein said water soluble organometallic precursor comprises an organo-titanium compound which converts to a titanium oxide catalyst.

8. The method of claim 7 wherein said titanium oxide is formed at a concentration of 0.01 wt. % to 1.0 wt. % in said diesel emissions fluid.

9. The method of claim 7 wherein said water soluble organo-titanium compound comprises titanium(IV) acetate.

10. The method of claim 7 wherein said water soluble organo-titanium compound comprises titanium(IV) bis(ammonium lactato)dihydroxide.

11. The method of claim 7 wherein said water soluble organo-titanium compound comprises titanium(III)oxalate.

12. The method of claim 7 wherein said water soluble organo-titanium compound comprises ammonium titanyl oxalate.

13. The method of claim 7 wherein said water soluble organo-titinium compound comprises titanium oxyacetylacetonate.

14. The method of claim 1 wherein said diesel emission fluid also contains zirconium dioxide.

15. A method of reducing oxides of nitrogen in a diesel engine producing diesel exhaust comprising:
providing a diesel emission fluid containing an aqueous based urea solution including a catalyst precursor comprising a water soluble organo-titanium compound dissolved in said urea solution;
introducing said diesel emission fluid into the diesel exhaust wherein said urea converts to ammonia and isocyanic acid and said catalyst precursor converts to titanium dioxide catalyst;
converting said isocyanic acid to ammonia with said titanium dioxide catalyst wherein said ammonia is provided to a selective catalytic reduction system and reacts with said oxides of nitrogen and provides nitrogen and water.

16. The method of claim 15 wherein said organo-titanium compound comprises titanium(IV) acetate.

17. The method of claim 15 wherein said organo-titanium compound comprises titanium(IV) bis(ammonium lactato) dihydroxide.

18. The method of claim 15 wherein said organo-titanium compound comprises titanium(III)oxalate.

19. The method of claim 15 wherein said water soluble organo-titanium compound comprises ammonium titanyl oxalate.

20. The method of claim 15 wherein said water soluble organo-titinium compound comprises titanium oxyacetylacetonate.

21. The method of claim 15 wherein said diesel emission fluid also contains zirconium dioxide.

22. A formulation for reducing oxides of nitrogen in diesel engine exhaust comprising:
- an aqueous based solution of urea;
- a water soluble organometallic catalyst precursor dissolved in said aqueous based solution of urea at a level of 0.1 wt. % to 25.0 wt. %.

23. The formulation of claim 21 wherein said aqueous based solution of urea contains 30.0 wt. % to 40.0 wt. % urea.

24. The formulation of claim 21 wherein said water soluble organometallic catalyst comprises one or more of titanium(IV) acetate, titanium(IV) bis(ammonium lactato) dihydroxide or titanium(III)oxalate, titanium(III)oxalate or titanium oxyacetylacetonate.

* * * * *